(12) United States Patent
Bellot et al.

(10) Patent No.: US 9,020,070 B2
(45) Date of Patent: **\*Apr. 28, 2015**

(54) HIGH CAPACITY WIRELESS COMMUNICATIONS SYSTEMS AND METHODS

(71) Applicants: Laurent Bellot, Versailles (FR);
Stéphane Blanc, Breuillet (FR);
Christian Bittar, Verriere le Buisson (FR); Tariq Boukour, Beuvry la Foret (FR); Jawad Elsayed, Courbevoie (FR);
Jean-Christophe Plumecoq, Palaiseau (FR); Alain Rolland, Quincy Sous Senart (FR)

(72) Inventors: Laurent Bellot, Versailles (FR);
Stéphane Blanc, Breuillet (FR);
Christian Bittar, Verriere le Buisson (FR); Tariq Boukour, Beuvry la Foret (FR); Jawad Elsayed, Courbevoie (FR);
Jean-Christophe Plumecoq, Palaiseau (FR); Alain Rolland, Quincy Sous Senart (FR)

(73) Assignee: E-Blink, Boussy Saint Antoine (FR)

( \* ) Notice: Subject to any disclaimer, the term of this patent is extended or adjusted under 35 U.S.C. 154(b) by 0 days.

This patent is subject to a terminal disclaimer.

(21) Appl. No.: 13/735,903

(22) Filed: Jan. 7, 2013

(65) Prior Publication Data

US 2013/0294541 A1    Nov. 7, 2013

(30) Foreign Application Priority Data

May 4, 2012 (FR) ...................................... 12 54139

(51) Int. Cl.
*H04B 7/06* (2006.01)
*H04W 28/02* (2009.01)
(Continued)

(52) U.S. Cl.
CPC .......... *H04W 28/0247* (2013.01); *H04W 24/00* (2013.01); *H04W 72/0453* (2013.01); *H04L 25/02* (2013.01); *H04W 88/085* (2013.01); *H04L 5/0001* (2013.01)

(58) Field of Classification Search
CPC .......... H04B 7/02; H04B 7/06; H04B 7/0667; H04B 7/068; H04B 7/0697
USPC ........................................ 375/267, 260, 299
See application file for complete search history.

(56) References Cited

U.S. PATENT DOCUMENTS

| 4,806,878 A | 2/1989 | Cowley |
| 5,513,176 A | 4/1996 | Dean et al. |

(Continued)

FOREIGN PATENT DOCUMENTS

| DE | 3108901 A1 | 9/1982 |
| EP | 1501215 A1 | 1/2005 |

(Continued)

OTHER PUBLICATIONS

International Search Report dated Aug. 9, 2013 Application No. PCT/EP2013/059236.

(Continued)

*Primary Examiner* — Kevin Kim
(74) *Attorney, Agent, or Firm* — Carr & Ferrell LLP (57) ABSTRACT

Systems and methods for efficiently transmitting information over a wireless network segment are provided herein. An exemplary method may include separating, via a transmitter, digital fronthaul data into general information and radio signal information, transmitting the general information over the wireless network segment from the transmitter to a receiver on a first communications channel, and transmitting the radio signal information over the wireless network segment from the transmitter to the receiver on a second communications channel.

23 Claims, 8 Drawing Sheets

(51) Int. Cl.
*H04W 24/00* (2009.01)
*H04W 72/04* (2009.01)
*H04L 25/02* (2006.01)
*H04W 88/08* (2009.01)
*H04L 5/00* (2006.01)

(56) References Cited

U.S. PATENT DOCUMENTS

| | | | |
|---|---|---|---|
| 5,533,011 | A | 7/1996 | Dean et al. |
| 5,602,834 | A | 2/1997 | Dean et al. |
| 5,652,765 | A | 7/1997 | Adachi et al. |
| 5,768,268 | A | 6/1998 | Kline et al. |
| 6,049,315 | A | 4/2000 | Meyer |
| 6,072,994 | A | 6/2000 | Phillips et al. |
| 6,094,677 | A | 7/2000 | Capek et al. |
| 6,223,021 | B1 | 4/2001 | Silvia et al. |
| 6,339,611 | B1 | 1/2002 | Antonio et al. |
| 6,349,214 | B1 | 2/2002 | Braun |
| 6,385,435 | B1 | 5/2002 | Lee |
| 6,389,059 | B1 | 5/2002 | Smith et al. |
| 6,603,956 | B1 | 8/2003 | Shin |
| 6,640,110 | B1 | 10/2003 | Shapira et al. |
| 6,904,266 | B1 | 6/2005 | Jin et al. |
| 7,010,325 | B1 | 3/2006 | Oh |
| 7,123,911 | B1 | 10/2006 | Ngan |
| 7,463,673 | B2 | 12/2008 | Fujii et al. |
| 7,535,972 | B2 * | 5/2009 | Hammerschmidt et al. .. 375/295 |
| 7,680,203 | B2 * | 3/2010 | Kuroda ......... 375/267 |
| 7,738,579 | B2 * | 6/2010 | Sadowsky et al. ......... 375/260 |
| 7,801,230 | B2 * | 9/2010 | Sung et al. ......... 375/260 |
| 8,064,821 | B2 | 11/2011 | Roland et al. |
| 8,275,310 | B2 | 9/2012 | Rolland et al. |
| 8,467,488 | B2 | 6/2013 | Rolland et al. |
| 8,761,141 | B2 | 6/2014 | Leroudier |
| 8,811,558 | B2 | 8/2014 | Rolland et al. |
| 2001/0011009 | A1 | 8/2001 | Harada et al. |
| 2001/0031624 | A1 | 10/2001 | Schmutz |
| 2002/0028655 | A1 | 3/2002 | Rosener et al. |
| 2002/0072375 | A1 | 6/2002 | Huslig |
| 2002/0147978 | A1 | 10/2002 | Dolgonos et al. |
| 2003/0027597 | A1 | 2/2003 | LaGrotta et al. |
| 2003/0140256 | A1 | 7/2003 | Hauenstein et al. |
| 2003/0232595 | A1 | 12/2003 | Baker et al. |
| 2004/0015712 | A1 | 1/2004 | Szor |
| 2004/0048596 | A1 | 3/2004 | Wyrzykowska et al. |
| 2004/0052226 | A1 | 3/2004 | Frank et al. |
| 2004/0077345 | A1 | 4/2004 | Turner et al. |
| 2004/0145849 | A1 | 7/2004 | Chang et al. |
| 2004/0166802 | A1 | 8/2004 | McKay, Sr. et al. |
| 2005/0085267 | A1 | 4/2005 | Lemson et al. |
| 2005/0101349 | A1 | 5/2005 | Pihlajamaa et al. |
| 2005/0130587 | A1 | 6/2005 | Suda et al. |
| 2005/0176368 | A1 | 8/2005 | Young et al. |
| 2005/0256963 | A1 | 11/2005 | Proctor, Jr. et al. |
| 2006/0068848 | A1 | 3/2006 | Shapira et al. |
| 2006/0140161 | A1 | 6/2006 | Stephens et al. |
| 2006/0205343 | A1 | 9/2006 | Runyon et al. |
| 2007/0053409 | A1 | 3/2007 | Reunamaki et al. |
| 2007/0091896 | A1 | 4/2007 | Liu |
| 2007/0147278 | A1 | 6/2007 | Millar |
| 2007/0243824 | A1 | 10/2007 | Roland et al. |
| 2008/0181171 | A1 | 7/2008 | Koziy et al. |
| 2009/0003831 | A1 | 1/2009 | Zheng |
| 2009/0252267 | A1 | 10/2009 | Rolland et al. |
| 2009/0325479 | A1 | 12/2009 | Chakrabarti et al. |
| 2012/0100847 | A1 | 4/2012 | Rahman |
| 2012/0140654 | A1 * | 6/2012 | Pak et al. ......... 370/252 |
| 2013/0243142 | A1 | 9/2013 | Rolland et al. |
| 2013/0294253 | A1 * | 11/2013 | Leroudier ......... 370/241 |
| 2014/0328274 | A1 | 11/2014 | Blanc et al. |
| 2014/0334305 | A1 | 11/2014 | Leroudier |

FOREIGN PATENT DOCUMENTS

| | | |
|---|---|---|
| EP | 1534027 | 5/2005 |
| EP | 1648099 A1 | 4/2006 |
| EP | 2099183 | 9/2009 |
| JP | 59154827 B | 9/1984 |
| WO | 2004/027635 | 4/2004 |
| WO | 2004/045125 | 5/2004 |
| WO | WO2013164445 | 11/2013 |

OTHER PUBLICATIONS

International Search Report dated Jul. 12, 2013 Application No. PCT/US2013/039338.

* cited by examiner

HIGH CAPACITY WIRELESS COMMUNICATIONS SYSTEMS AND METHODS

CROSS-REFERENCE TO RELATED APPLICATIONS

This non-provisional U.S. patent application claims the priority benefit of French Application Number 1254139, filed on May 4, 2012, which is hereby incorporated herein its entirety including all reference cited therein. This non-provisional U.S. patent application is also related to U.S. patent application Ser. No. 13/732,273, filed on Dec. 31, 2012.

FIELD OF THE INVENTION

The present technology may be generally described as providing efficient methods for transmitting data over wireless network segments by separating digital fronthaul data into radio signal information and general information.

BACKGROUND

Transmitting data across a wired network, such as a fiber network allows for high capacity and high velocity data transmission. Unfortunately, wired networks may be limited in geographical reach. Wireless networks allow for data transmission into locales where wired networks are unavailable. Wireless networks are bandwidth limited and thus do not currently provide the data transmission capacity and velocity afforded by wired networks.

SUMMARY OF THE PRESENT TECHNOLOGY

According to some embodiments, the present technology may be directed to a method for efficiently transmitting information over a wireless network segment. The method may include: (a) separating, via a transmitter, digital fronthaul data into general information and radio signal information; (b) transmitting the general information over the wireless network segment from the transmitter to a receiver on a first communications channel; (c) and transmitting the radio signal information over the wireless network segment from the transmitter to the receiver on a second communications channel.

A system, comprising a baseband unit (BBU) communicatively coupled with a radio frequency unit (RFU), at least one of the BBU and the RFU being configured to separate digital fronthaul data into general information and radio signal information, transmit the general information over a wireless network segment on a first communications channel, and transmit the radio signal information over the wireless network segment on a second communications channel.

According to some embodiments, the present technology may be directed to a method of transforming information for efficient transmission over a wireless network segment, the method comprising: (a) separating, via a transmitter, digital fronthaul data into general information and radio signal information; (b) converting the radio signal information into a plurality of radio frequency carrier signals; and (c) digitally modulating the general information.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally, the present technology may provide for high capacity wireless communications between one or more base band units ("BBU") and one or more radio frequency units ("RFU") within a wireless network assembly, such as a base station ("BS"). The BBU and RFU communicate digitally with one another through a bidirectional transport interface. Signals representing carrier data that may be transmitted and received by the antenna(s) associated with the base station (BS) may be sent in a format known as "I/Q," which stands for "in phase/in quadrature." Other information that does not represent carrier data may also be communicated between the BBU and RFU. These two types of information are typically multiplexed into a digital fronthaul data. While in some instances, a system implemented according to the method described herein may output the I/Q coded carrier data directly as RF carriers (i.e. in an analog format), one of ordinary skill in the art would recognize that such a system would implement an internal interface where this data is digitally coded as I/Q quantized data prior to outputting this signal as analog data.

More specifically, the BBU and the RFU may be communicatively coupled using a standardized/approved open protocol (e.g., interface, a proprietary protocol, or a combination thereof). In some embodiments, protocols utilized between the BBU and RFU facilitate bidirectional transmission of the digital fronthaul data between the BBU and the RFU either by fiber optics or other wired coupling types. In an embodiment, time-division multiplexing may be used to transport various types of information such as general information, which may include, but is not limited to control, command, synchronization, and other data, other than "I/Q" information. Radio signals comprising carrier data, also referred to as "traffic data" or "I/Q data," may be transmitted and received by various antenna(s) associated with the Base Station.

These protocols may be entirely digital in nature and their throughput can range between approximately 600 megabits/s to 10 gigabits/s, inclusive. The structure of these protocols typically includes a set amount of words that represent general information and a set amount of words that represent the I/Q data. In some instances the set amount of words representing the general information may be relatively smaller than the set amount of words that represent the I/Q data.

Normally, in order to transport both the I/Q data and the general information, the I/Q data (e.g., radio signal information) is transmitted as a whole in digital form. Digital streams and/or multiplexes may be handled by the system at gradually increasing throughput rates. For example, digital streams on the order of approximately tens of gigabits/s may be transmitted corresponding to I/Q data of radio access technologies such as 3G/4G, LTE "Long Term Evolution", LTE-Advanced, and so forth.

Because of its almost limitless capacity, fiber optic media may be utilized to transmit I/Q data. Other solutions contemplate transmitting the digital I/Q and/or general data using wireless networks. One solution contemplates the use of radio waves. This solution requires a substantial throughput rate in order to transport the entire structure (e.g., both I/Q and general data), and thus, substantial bandwidth utilization or sophisticated modulation may be required. These exemplary methods are described in greater detail in European Patent 1534027, which is hereby incorporated by reference herein in its entirety including all references cited therein. Another solution contemplates the use of optical waves, as indicated in document U.S. Patent Application Publication Number 2003-027597, which is hereby incorporated by reference herein in its entirety including all references cited therein. While both of these wireless systems propose a digital solution for connecting the BBU module to the RFU radio, these systems suffer from drawbacks which include, but are not limited to the fact that the throughput (e.g., fronthaul) of these systems is quite substantial.

Advantageously, the present technology allows for the transmission of information using wireless systems in such a way that a substantial reduction in the size of the throughput between the BBU and the RFU is achieved while ensuring complete transmission of I/Q data, which is constantly evolving and growing over time. These and other advantages of the present technology will be described in greater detail below with reference to the drawings.

Figure 1:
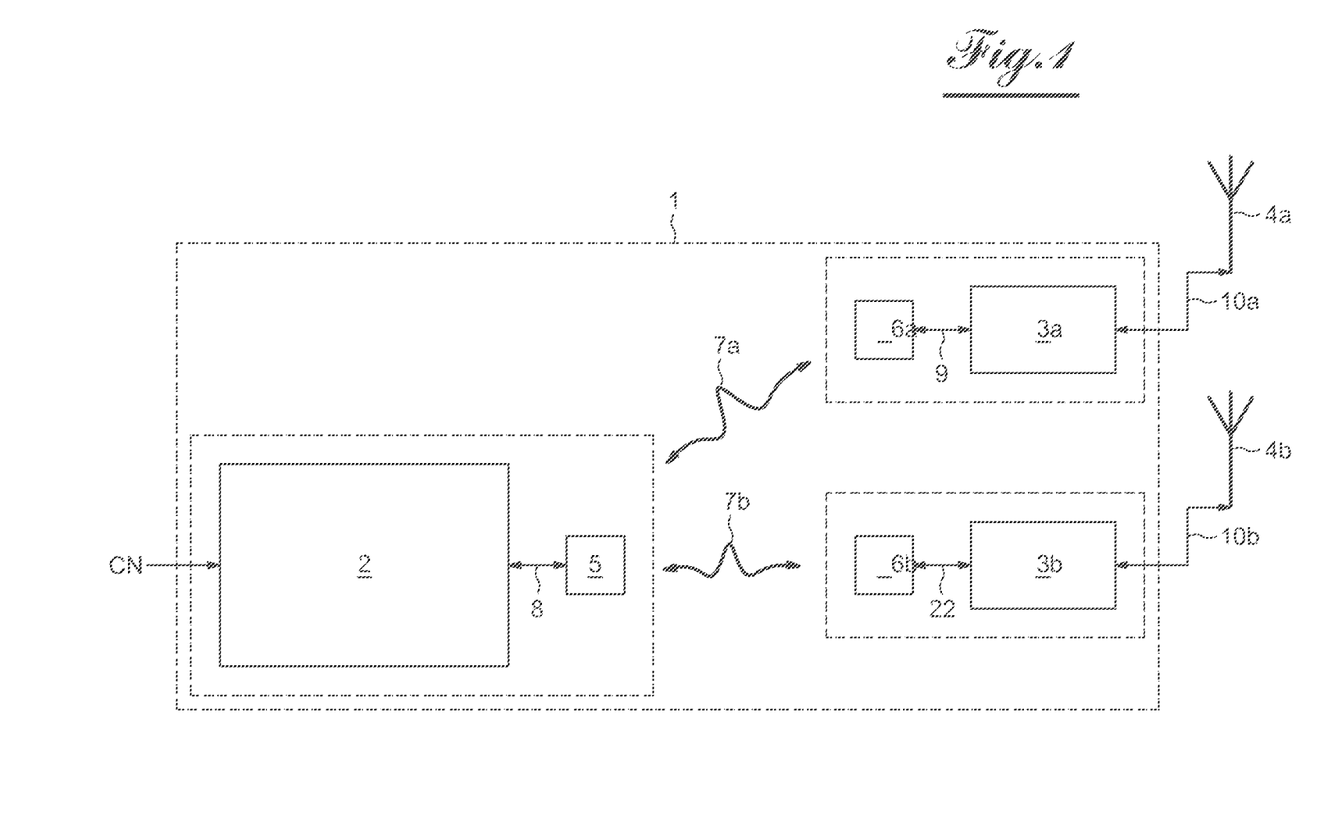
FIG. 1 is a schematic representation of a base station structure implementing the method for transmitting information according to the invention.

Referring now to FIG. 1, which illustrates an exemplary architecture for practicing aspects of the present technology. A base station (BS) 1 is shown as comprising a baseband unit (BBU) 2, which is communicatively coupled with the core network (CN). The CN manages communicative coupling with a public telephony (PSTN) or data network. BBU 2 may be communicatively coupled with a BBU Coupling Unit 5 via any suitable path or channel that allows for the transmission of digital data.

The BS 1 may also comprise a series of radio frequency units, such as radio frequency unit (RFU) 3a and 3b. In this example, two RFUs are present. In one instance, RFU 3a may be communicatively coupled with a RFU coupling module 6a by a communications channel 9 which may allow for analog or mixed analog and digital transmission. In the other instance, RFU 3b may be communicatively coupled to a RFU coupling module 6b by a digital communications channel 22. In an embodiment, RFU 3a may be communicatively coupled to an antenna 4a by a second communication path 10a and RFU 3b may be communicatively coupled to an antenna 4b by a second communication path 10b. The BBU coupling unit 5 additionally communicates with all RFU coupling modules 6a and 6b via a wireless communications channel 7a or 7b, also referred to as a "wireless network segment."

FIGS. 1, 2, 4, and 5 collectively illustrate an exemplary system and method for transmitting information using the system of FIG. 1. According to some embodiments, the BBU 2 may be communicatively coupled with the core network CN according to methods that would be known to one of ordinary skill in the art with the present disclosure before them.

Figure 2:
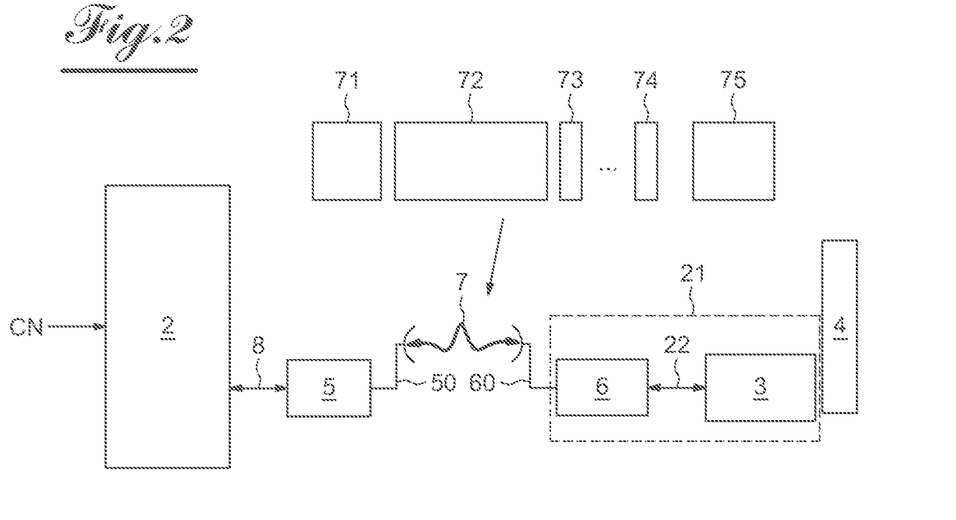
FIG. 2 is a schematic representation of the transmitting of information between two units of the base station of FIG. 1.

The BBU 2 communicates with at least one of the RFUs 3a or 3b using the BBU coupling unit 5, to which the BBU 2 is communicatively coupled via a digital communications channel 8. While the BBU coupling unit 5 and BBU 2 have been shown as being separate devices, in some instances the BBU coupling unit 5 and the BBU 2 may be integrated into the same device. In some embodiments digital protocol frames 80 may be transmitted between the BBU 2 and an RFU 3 via BBU coupling unit 5 using the digital communications channel 8. It is noteworthy that a digital protocol frame 80 may comprise a series of words related to information of two types: (a) words corresponding to general information; and (b) words corresponding to "I/Q" radio signal information. While the method contemplates the use of "words" to differentiate between the two basic types of information included in the digital fronthaul data, the system may be configured to differentiate information types using any other differentiators that may also be used in accordance with the present technology.

Generally, a method for transmitting information may comprise separating digital fronthaul data into the two basic data types, comprising I/Q data and general data. In some instances, separating digital fronthaul data may include demultiplexing of the digital fronthaul data by evaluating digital protocol frames 80.

In another method, the method for transmitting information may comprise separating analog RF signals and the general data, and transmitting them on two different channels.

The digital protocol frames may be evaluated to differentiate words related to general information from the words related to IQ radio signal information in each of the digital protocol frames 80.

Figure 4:
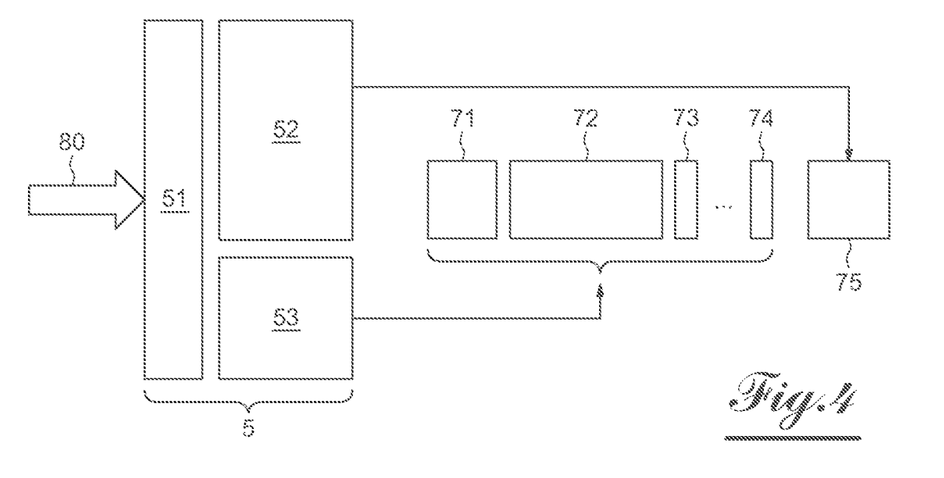
FIG. 4 is a schematic representation of the transmission information according to the present technology at the level of a transmitter.

Again, data included in the digital protocol frames 80 may be demultiplexed in a demultiplexing module 51 in the BBU coupling unit 5. The BBU coupling unit 5 may then transmit the demultiplexed information types via the wireless communications channel 7 using an antenna 50. More specifically, the digital protocol frames 80 may be separated into general information and radio frequency information. The general information may be extracted from the protocol frames 80 by the demultiplexing module 51 and passed through as digitally modulated data by digital modulator module 52. The radio frequency information may be further separated into information constituting radio frequency carrier signals 71-74, also referred to as carrier images and modulated accordingly into radio frequency carriers 71-74 by module 53.

Words related to general information may be transmitted through a digital communication channel of the wireless communications channel 7 using digital modulation. With regard to the I/Q radio signals, it should be noted that the I/Q radio signals ultimately represent carriers intended for transmission or reception by the antenna(s) 4 associated with the base station 1. The base station 1 may process the I/Q radio signals with the appropriate technologies required by the radio access interfaces (Radio Access Technology or "RAT"), which allows for communication between mobile telephones and the antennas 4 of the BS 1.

Next, the BBU coupling unit 5 may be configured to separate the words related to I/Q radio signals into a series of radio frequency carriers. The information belonging to I/Q radio signals contained in the digital protocol frame 80 are transmitted as radio frequency carriers 71, 72, 73, 74 by the BBU coupling unit 5 through the wireless communications channel 7.

It will be understood that the transmission of I/Q radio signals used by the wireless communications channel 7 may be based on similar radio access technologies implemented by the one or more RFU 3 for the carriers and RAT in question, transmitted and received by the antennas 4 and associated with the RFU 3. For example, the radio technology used to transmit the I/Q radio signals may enhance the efficiency of data transmission over the wireless communications channel 7 relative to various performance characteristics of the wireless medium. These performance characteristics include, but are not limited to line of sight propagation, point-to-point topology, lower interference, and so forth.

The words related to I/Q radio signals are converted into radio frequency carriers 71, 72, 73, 74 using techniques that would be known to one of ordinary skill in the art such as filtering, digital up conversion "DUC", I/Q mixing, mixing, digital/analog conversion, and so forth.

Advantageously, transmitting I/Q radio signals in the form of radio frequency carriers may be transparent at the throughput rates proposed by RATs of operators of the BS 1, as the integrity of the I/Q radio signals, carrier "images", and RATs, transmitted and received by the antennas 4 is sufficiently maintained with regard to the overall performance of the wireless communications channel 7. In some instances, transmitting I/Q radio signals in the form of radio frequency carriers may be accomplished in a non-transparent manner.

Moreover, the bandwidth necessary for the wireless communications channel 7 may be as defined by the associated RAT(s), which are transmitted and received by the antennas 4 associated with the RFU 3.

As an end result, a series of radio frequency carriers 71, 72, 73, 74 for each digital protocol frame 80 may be transmitted through the wireless communications channel 7, and one or more digital modulations may be utilized to transmit the general information protocol elements. The series of radio frequency carriers 71, 72, 73, 74 and the digitally modulated transmissions 75 are then received by the RFU coupling module 6 using an antenna 60.

Figure 5:
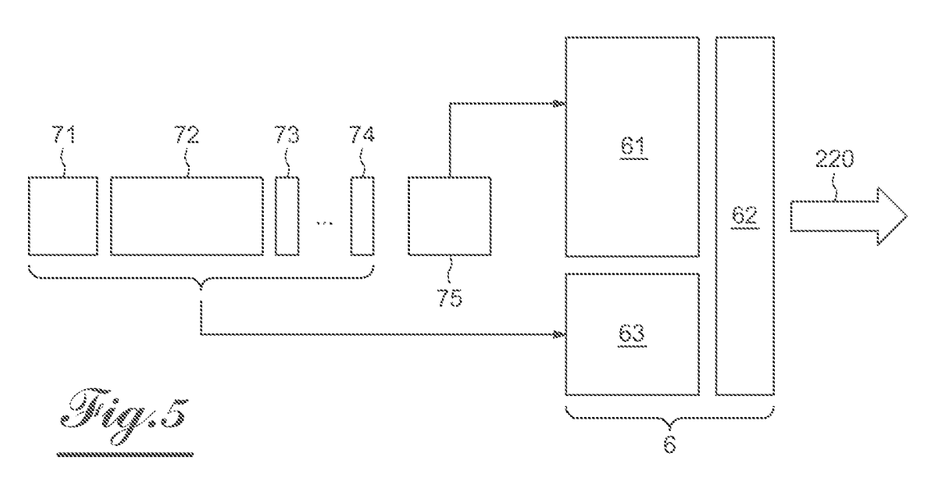
FIG. 5 is a schematic representation of the transmission information according to the present technology at the level of a receiver.

Next, the RFU coupling module 6b may perform a method of reassembling the fronthaul signals and data from the previously separated data (e.g., I/Q radio signals and general information). An exemplary method for transmitting information may further comprise converting the series of radio frequency carriers 71, 72, 73, 74 into a series of words representing the I/Q radio signal information. Again, techniques that would be known to one or ordinary skill in the art may be utilized, such as filtering, digital down conversion "DDC", I/Q mixing, mixing, digital/analog conversion and so forth.

The digitally modulated transmissions 75 may be used by the RFU 3b according to a pre-established protocol.

More specifically, the method may include conversion by conversion unit 63 of the series of radio frequency carriers 71, 72, 73, 74 into a series of words representing the content of the I/Q radio signals, and demodulation of the digitally modulated data into words representing the general information 61. The series of words may be multiplexed by reassembling the words to recreate digital protocol frames 220, which correspond to the digital protocol frames 80 which were previously demultiplexed. The digital protocol frames 220 are then transmitted to the RFU 3b through second communications channel 22. The second communications channel 22 may allow for the transmission of digital and/or analog data.

In order to ensure proper reconstruction of the digital protocol frames 220, synchronization information is transmitted between the BBU coupling unit 5 and the RFU coupling module 6b to allow the general information and the I/Q radio signal information of the digital protocol frames 220 to be returned to a coherent form.

More specifically, the method may include conversion by conversion unit 63 of the series of radio frequency carriers 71, 72, 73, 74 into a series of words representing the content of the I/Q radio signals, and demodulation of the digitally modulated data into words representing the general information 61. The series of words may be multiplexed by reassembling 62 the words to recreate digital protocol frames 220, which correspond to the digital protocol frames 80 which were previously demultiplexed. The digital protocol frames 220 are then transmitted to the RFU 3b through second communications channel 22. The second communications channel 22 may allow for the transmission of digital and/or analog data.

In another exemplary embodiment were information not useful to the digital protocol frame 80 is removed in order to eliminate useless information. For example, words that are not filled or used may be eliminated. Thus, only necessary information may be transmitted, proportionally reducing the volume of information transmitted.

Figure 3:
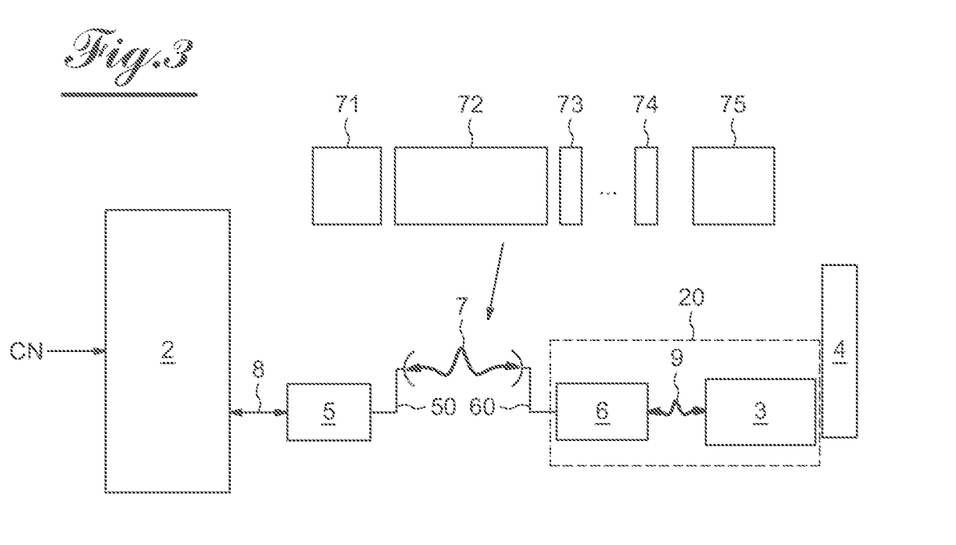
FIG. 3 is a schematic representation of the transmitting of information between two units of the base station of FIG. 1.

FIG. 3 illustrates another exemplary embodiment where the RFU coupling module 6a and the RFU 3a form a wireless remote radio head (RRH). According to some embodiments, the RFU coupling module 6a retransmits to the RFU the radio frequency carriers 71, 72, 73, 74 via first communications channel 9, for retransmission via the antenna 4a associated with the RFU 3a. According to some embodiments, the RFU coupling module 6a may not multiplex the general information words and in some instances it may not convert the radio frequency carriers 71, 72, 73, 74 into words related to the I/Q radio signal information. Accordingly, the aforementioned digital protocol frames 220 may not be reconstructed by the RFU coupling module 6b. Alternatively, the RFU coupling module 6b may adapt the radio frequency carriers 71, 72, 73, 74 based on the associated RATs for transmission by the relay antenna 4b associated with the RFU 3b.

In some instances the general information may be processed by the RFU coupling module 6 (e.g., instead of being transmitted to 3 which then uses it to perform control or management tasks). In some instances, in addition to the first communications channel 9, which may comprise an analog communication link, there may be a separate control interface (such as an API) over which a control and management process can take place.

The term "processing" may be understood to include the modification of RF signals based upon the content control information included in the general information.

According to some embodiments, a BBU coupling module 6a may be used to interpret and utilize the general information in order to perform various actions, such as actions performed by the RFU 3*a* with regard to the same type of information. Thus, it may no longer be necessary to transmit complete general information to the RFU 3*a*, which may result in a reduction in the amount of information from the digital protocol frame, leading to more efficient data transmission.

It should be noted that in an exemplary operation, data may be transmitted between the BBU 2, serving as a transmitter, to one of the RFUs 3, serving as a receiver. However, data may likewise be transmitted between one of the RFUs 3, in this case serving as a transmitter, to the BBU 2, which in this case would serve as a receiver.

Advantageously, the present technology may allow for processing of radio frequency carriers in terms of bandwidth (MHz/bandwidth) rather than in terms of throughput rate (Mbit/s) via the wireless communications channel 7. Again, the wireless communications channel 7 may communicatively couple the BBU 2 and the series of RFUs 3 of the BS 1. This configuration allows for a digital solution that benefits from the modulation efficiency of the technologies implemented on this wireless communications channel 7.

Additionally, spectrum efficiency may be maintained transparently with regards to the Radio Access Technology used on wireless communication channel 7. The present technology can also benefit from the inherent advantages of line of sight/non-line of sight "LoS/NLoS" technologies between fixed stations and single users. Additionally, this method allows the use of different frequency bands to transmit different signals according to the methods described in European Patent Number 1895681, which is hereby incorporated by reference herein in its entirety including all references cited therein.

In some instances the present technology advantageously accommodates complementary diversity technologies to increase efficiency such as multi-polarization, line-of-sight multiple-input multiple-output "LoS MIMO," and so forth.

While methods and systems for transmitting information described above relate to the field of mobile telephony, the present technology may be applicable to many types of radio networks such as public mobile radio networks "PMR" used by law enforcement and first responders, as well as in any radio system that includes radio stations and antennas or active antennas and/or radar—just to name a few.

Figure 8A:
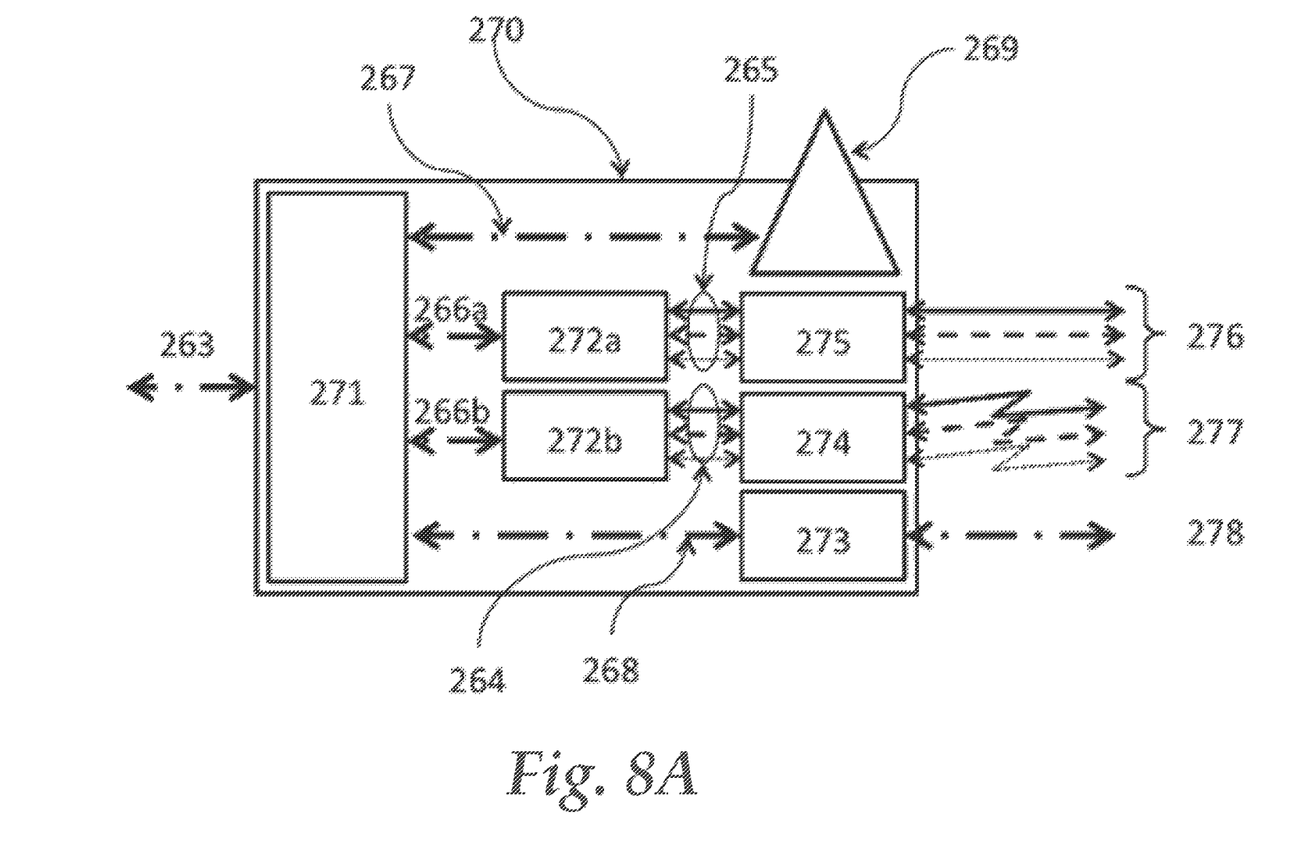
FIG. 8A illustrates an exemplary functional implementation of a fronthaul module according to the present technology.

FIG. 8A illustrates an exemplary functional implementation of a fronthaul module 270 according to the present technology. Fronthaul module 270 presents a digital interface 263 using for example a fiber optic medium. The traffic on fronthaul interface 263 comprises a multiplexed signal that includes several fronthaul signals which are transmitted between a baseband unit and a plurality of mobile wireless transceivers, which are communicatively coupled together via the wide area radio access network. An exemplary mobile wireless transceivers is represented as 269. Interface processing module 271 demultiplexes and multiplexes two or more of the fronthaul signals (e.g., fronthaul signals 266*a*, 266*b*, 267 and 268) according to a predefined multiplexing algorithm. Fronthaul signals may contain the fronthaul information for the subset of mobile wireless transceivers for which they are destined. Fronthaul signal 266*a* is fed into processing unit 272*a* which decomposes fronthaul signal 266*a* into a RF carriers signal built from the I/Q data contained within fronthaul signal 266*a*, digitally modulated general control data and digitally modulated user information, both contained in the fronthaul signal 266*a*, and altogether multiplexed into signal 265. A similar process applies to 266*b* through 272*b* and producing signal 264. Fronthaul signal 267 is transmitted into mobile wireless transceiver 269 which may be integrated inside the fronthaul module 270 or communicatively coupled with fronthaul module through an interface.

Multiplexed signal 265 is fed into interface module 275, which may use a wireline medium 276 comprising of any of fiber optic, coaxial cable or copper line. Multiplexed signal 264 may be fed into interface module 274, which may use a wireless medium 277. Interface module 274 can be implemented as a radio transceiver and antenna with the appropriate performance for transmitting multiplexed signal 264 over a certain distance. Fronthaul signal 268 is fed into a digital interface module 273 that may utilize a high capacity wireline medium 278. The signal transiting on this interface consists of the relevant fronthaul information to provide fronthaul signals to mobile wireless transceivers for which they are destined.

While the above represents one direction of the signal flows, all interfaces and modules are designed to process bidirectional signals, such that each operation has its symmetrical function for handling traffic in the other direction.

Figure 8B:
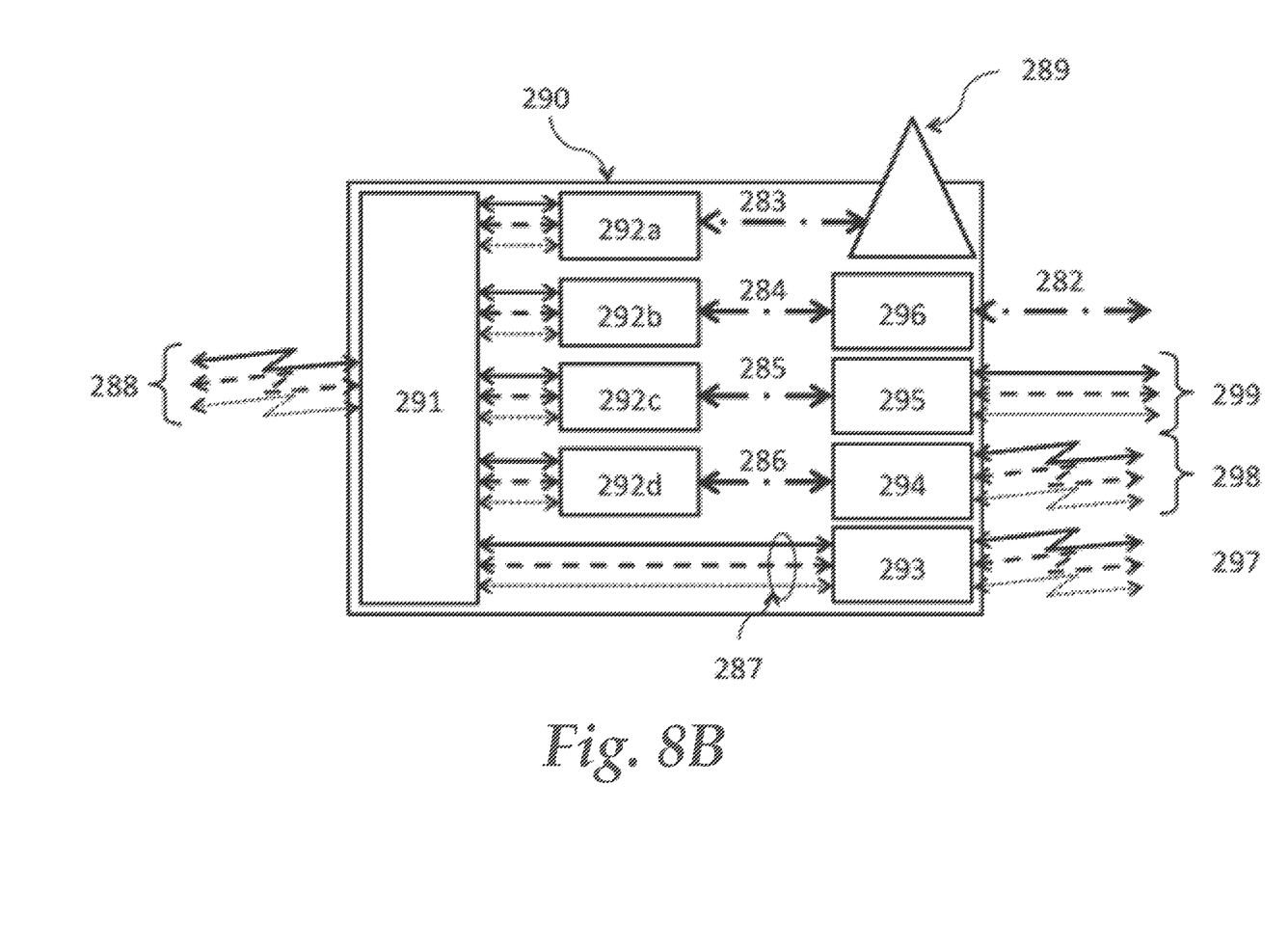
FIG. 8B illustrates another exemplary fronthaul module constructed in accordance with the present technology.

FIG. 8B illustrates another exemplary fronthaul module constructed in accordance with the present technology. In this case fronthaul module 290 uses a wireless interface 288 to receive data received from the baseband unit located within the Wide Area Radio Access Network (e.g., wireless network) and to transmit data received from one or more mobile wireless transceivers, to the baseband unit. The signals on this wireless interface may comprise a multiplex of modulated RF carriers, digitally modulated general control signals and digitally modulated user information.

Interface module 291 includes a wireless transceiver to process the wireless signals and to demultiplex the aggregated fronthaul signals into individual fronthaul signals which are transmitted fronthaul processing modules 292*a*, 292*b*, 292*c* and 292*d*, as well as into interface module 293. It is noteworthy that two types of multiplexing may occur: (1) multiplexing several fronthaul signals destined to multiple RRUs (mobile wireless transceivers); and (2) multiplexing the RF carriers with the control information and with the user information for each individual fronthaul signal, as well as to multiplex fronthaul signals from the mobile wireless transceivers which are destined for the baseband unit (reverse operation). The purpose of 292*a*, 292*b*, 292*c* and 292*d* is to transform the digital fronthaul signal into a multiplex of radio carriers, digitally modulated control and digitally modulated user information, resulting in digital fronthaul signals 283, 284, 285 and 286, respectively.

In the present example, digital fronthaul signal 283 is transmitted to mobile wireless transceiver 289, which is equipped with a digital wireless fronthaul interface. One example of such interface is given by the Common Public Radio Interface standard or CPRI and the corresponding systems are sometimes referred to as Remote Radio Heads (RRH) or Remote Radio Units (RRU). Conversely digital fronthaul signal 283 is also used to carry uplink signals from the mobile wireless transceiver 289 and destined for the baseband unit. In this case, the digital fronthaul signal may only contain the fronthaul signal relevant to mobile wireless transceiver 289.

In the present example, digital fronthaul signal 284 is provided to digital fronthaul interface unit 296 which provides an external digital fronthaul interface 282 used to transmit and receive fronthaul information relevant to the mobile wireless transceivers located in the corresponding part of the network (i.e., "behind" this port). In this case, digital fronthaul interface 282 may contain the fronthaul signal relevant to those mobile wireless transceivers. As an example, digital fronthaul interface 282 may use a fiber medium with a high capacity.

In another example, digital fronthaul signal 285 is transmitted to fronthaul interface unit 295 which provides fronthaul interface 299 used to transmit and receive fronthaul signals relevant to the mobile wireless transceivers located in the corresponding part of the network (i.e. "behind" this port). In this case fronthaul interface 299 comprises a multiplex of RF carriers, digitally modulated control information and digitally modulated user information carried over a wireline medium. In this case, fronthaul interface 299 may only contain the fronthaul signal relevant to those mobile wireless transceivers. As an example, fronthaul interface 299 may use a fiber medium (or a wavelength of a fiber) or a coaxial cable medium. (In the present example, digital fronthaul signal 286 is used to feed wireless fronthaul interface unit 294 which provides external wireless interface 298 used to transmit and receive fronthaul information relevant to the mobile wireless transceivers located in the corresponding part of the network (i.e., "behind" this port)). In this case fronthaul interface 298 comprises a multiplex of RF carriers, digitally modulated control information and digitally modulated user information carried over a wireless medium. In this case, wireless fronthaul interface 298 may contain the fronthaul signal relevant to those mobile wireless transceivers. As an example, wireless fronthaul interface 298 may comprise an appropriately engineered RF transceiver and antenna.

In the present example, fronthaul signal 287 is a multiplex of RF carriers, digitally modulated control information and digitally modulated user information carried between interface module 291 and wireless interface module 293. Wireless interface module 293 may comprise an appropriately engineered RF transceiver and antenna. In this case, wireless fronthaul signal 287 and wireless fronthaul signal 297 may comprise the fronthaul signal relevant to those mobile wireless transceivers located in the corresponding part of the network. In this case, no conversion to digital fronthaul format is required.

Figure 6A:
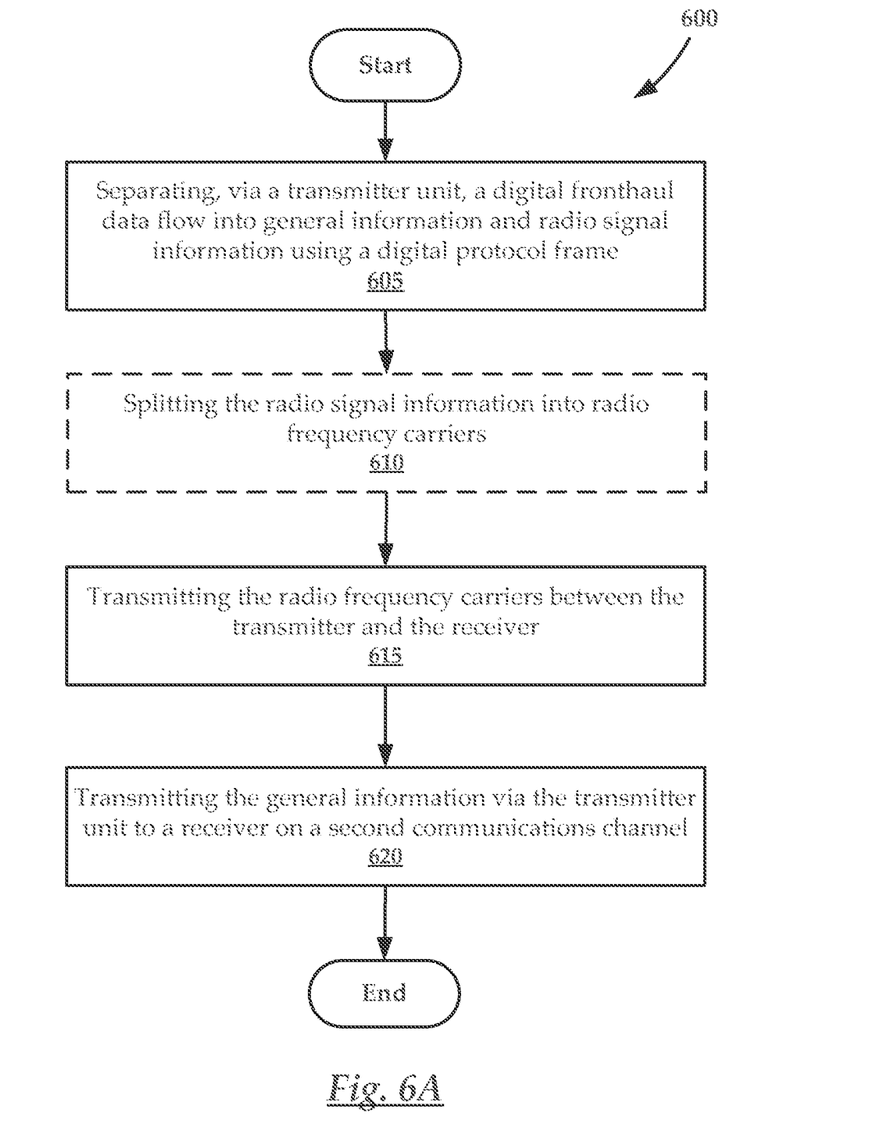
FIGS. 6A and 6B are flowcharts of an exemplary method for transmitting information.

FIG. 6A is a flowchart of an exemplary method 600 for transmitting information via a wireless communications channel. According to some embodiments, the method 600 may comprise a step 605 of separating, via a transmitter unit, a digital fronthaul data flow into general information and radio signal information using a digital protocol frame. According to some embodiments, the step 605 of separating may include demultiplexing of the general information and the radio signal information from the digital fronthaul data.

In some instances, in the step 605 of separating, information not belonging to the digital protocol frame may be removed to reduce the amount of unneeded data that is transmitted over the wireless network segment. This feature may reduce the latency of the wireless network segment, while also reserving network bandwidth for greater consumption and transmission of radio signal information and/or general information.

Additionally, the method 600 may comprise a step 610 of splitting the radio signal information into radio frequency carriers as well as a step 615 of transmitting the radio frequency carriers between the transmitter and the receiver. The transmission of the radio signal information and/or carrier is carried out using appropriate radio access interface technologies. Again, the radio access technologies utilized may be optimized or enhanced relative to the selected transmission method or medium. Moreover, step 620 may include a step of transmitting the general information via the transmitter unit to a receiver on a second communications channel. In some instances, the transmitter and the receiver may be communicatively coupled with one another using a digital communications channel. In some instances, the general information may be transmitted over the wireless network segment by digital modulation of the general information.

Figure 6B:
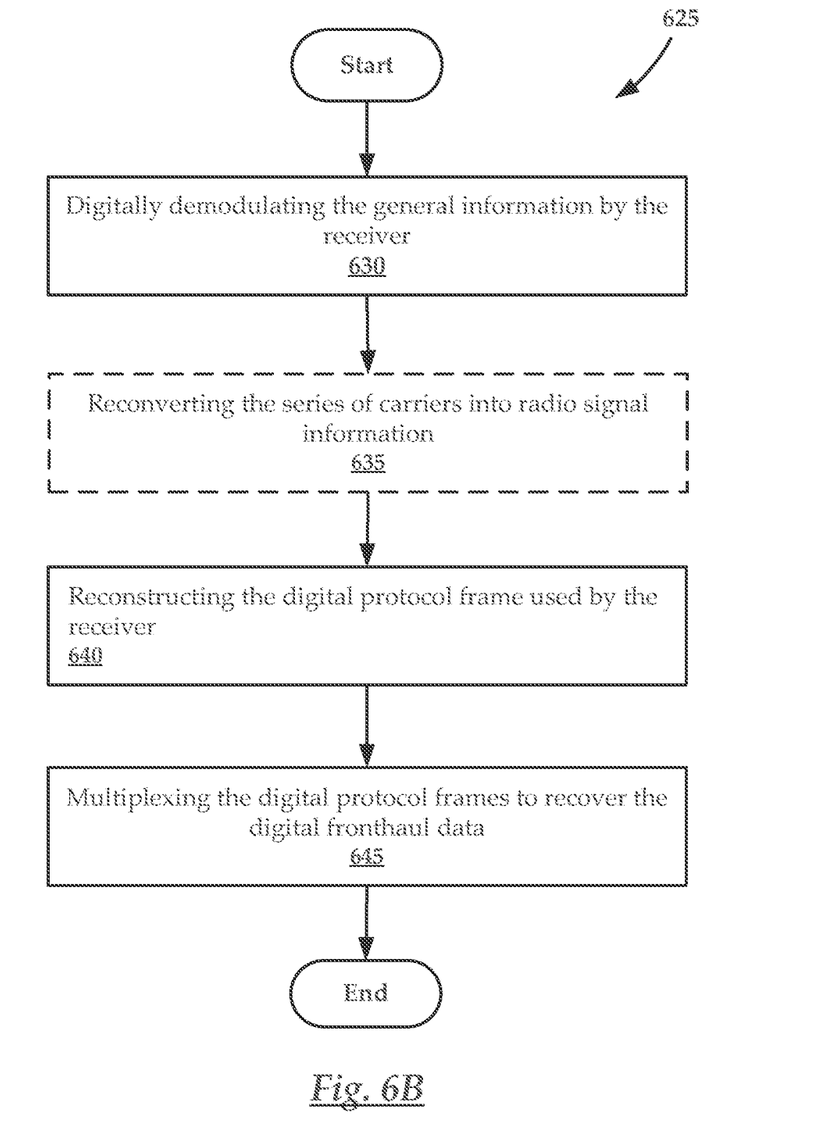

FIG. 6B is a flowchart of an exemplary method 625 for transmitting information. It is noteworthy that the method described with regard to FIG. 6A specifies the separating of digital fronthaul data into constituent parts to enhance the transmission of the constituent parts over a wireless network segment. The method 625 of FIG. 6B contemplates the reassembling of the separated parts transmitted over the wireless network segment in such a way that the digital fronthaul data is recreated.

The method 625 may include a step 630 of digitally demodulating the general information as it is received by the receiver (or prior to receipt of the general information). Similarly, the method 625 may include a step 635 of reconverting the series of carriers into radio signal information such as I/Q digital data. Again, the radio signal information is a digital (or in some instances analog) signal. By extension, the step 635 allows for a step 640 of reconstructing the digital protocol frames used by the receiver. After reconstructing the digital protocol frames, the method may include a step 645 of multiplexing the digital protocol frames to recover the digital fronthaul data. It is noteworthy that the recovered digital fronthaul data may include less data than the original digital fronthaul data if unneeded data was removed during a subsequent step of evaluating the digital protocol frames.

Although not shown, exemplary methods may also include steps such as transmitting information for synchronizing the general information and the radio signal information as well as buffering of both the general information and the radio frequency information before synchronizing the general information and the radio signal information. This synchronization may depend, in part, on the synchronization information used. It is noteworthy that transmission steps may be carried out on different frequency bands. Additionally, in some embodiments the transmitter may include a baseband unit and the receiver may include at least one radio frequency unit, or vice versa.

Other exemplary methods may include the step of processing the general information in the BBU coupling unit 5 prior transmitting it. The term "processing" may be understood to include the modification of RF signals based upon the content control information included in the general information.

Figure 7:
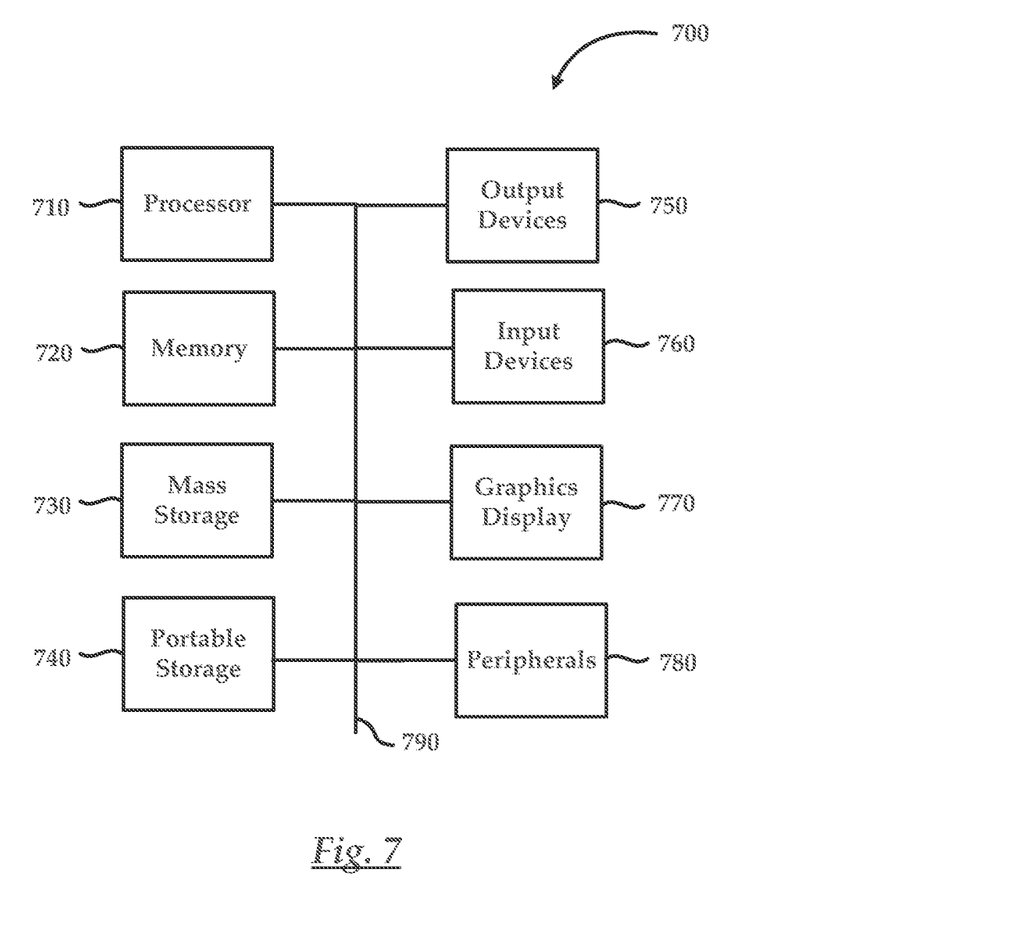
FIG. 7 illustrates an exemplary computing system that may be used to implement embodiments according to the present technology.

FIG. 7 illustrates an exemplary computing system 700 that may be used to implement an embodiment of the present technology. The computing system 700 of FIG. 7 includes one or more processors 710 and memory 720. Main memory 720 stores, in part, instructions and data for execution by processor 710. Main memory 720 can store the executable code when the system 700 is in operation. The system 700 of FIG. 7 may further include a mass storage device 730, portable storage device 740, output devices 750, user input devices 760, a graphics display 770, and other peripheral devices 780. The system 700 may also comprise network storage (not shown).

FIG. 7 illustrates an exemplary computing system 700 that may be used to implement an embodiment of the present technology. The computing system 700 of FIG. 7 includes one or more processors 710 and memory 720. Main memory 720 stores, in part, instructions and data for execution by processor 710. Main memory 720 can store the executable code when the system 700 is in operation. The system 700 of FIG. 7 may further include a mass storage device 730, portable storage medium drive(s) 740, output devices 750, user input devices 760, a graphics display 770, and other peripheral devices 780.

The components shown in FIG. 7 are depicted as being connected via a single bus 790. The components may be connected through one or more data transport means. Processor unit 710 and main memory 720 may be connected via a local microprocessor bus, and the mass storage device 730, peripheral device(s) 780, portable storage device 740, and graphics display 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present technology for purposes of loading that software into main memory 720.

Portable storage device 740 operates in conjunction with a portable non-volatile storage medium, such as a floppy disk, compact disk or digital video disc, to input and output data and code to and from the computing system 700 of FIG. 7. The system software for implementing embodiments of the present technology may be stored on such a portable medium and input to the computing system 700 via the portable storage device 740.

Input devices 760 provide a portion of a user interface. Input devices 760 may include an alphanumeric keypad, such as a keyboard, for inputting alphanumeric and other information, or a pointing device, such as a mouse, a trackball, stylus, or cursor direction keys. Additionally, the system 700 as shown in FIG. 7 includes output devices 750. Suitable output devices include speakers, printers, network interfaces, and monitors.

Graphics display 770 may include a liquid crystal display (LCD) or other suitable display device. Graphics display 770 receives textual and graphical information, and processes the information for output to the display device.

Peripherals 780 may include any type of computer support device to add additional functionality to the computing system. Peripheral device(s) 780 may include a modem or a router.

The components contained in the computing system 700 of FIG. 7 are those typically found in computing systems that may be suitable for use with embodiments of the present technology and are intended to represent a broad category of such computer components that are well known in the art. Thus, the computing system 700 of FIG. 7 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be communicatively coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method of efficiently transmitting information over a wireless network segment, the method comprising:
    separating, via a transmitter, digital fronthaul data into general information and radio signal information, wherein the radio signal information is a representation of a signal in an analog format and the general information is in a digital format;
    transmitting the general information in a digital format over the wireless network segment from the transmitter to a receiver on a first communications channel; and
    transmitting the radio signal information in an analog format over the wireless network segment from the transmitter to the receiver on a second communications channel.

2. The method according to claim 1, wherein separating comprises converting the radio signal information into a plurality of analog radio frequency carrier signals; and digitally modulating the general information.

3. The method according to claim 2, wherein the radio signal information is converted into the plurality of analog radio frequency carrier signals using any of filtering, digital up converting, in-phase and in-quadrature mixing, mixing, digital to analog conversion, and combinations thereof.

4. The method according to claim 1, further comprising processing the radio signal information using at least one radio access technology protocol used in the wireless network segment.

5. The method according to claim 1, further comprising storing at least a portion of the radio signal information in a buffer prior to transmitting the radio signal information over the wireless network segment from the transmitter to the receiver on the second communications channel.

6. The method according to claim 1, further comprising storing at least a portion of the general information in a buffer prior to transmitting the general information over the wireless network segment from the transmitter to the receiver on the first communications channel.

7. The method according to claim 1, wherein separating comprises:
    demultiplexing digital protocol frames of the digital fronthaul data;
    determining words associated with the general information and words associated with the radio signal information; and
    separating the general information from the radio signal information based upon the step of determining.

8. The method according to claim 7, further comprising converting the words associated with the radio signal information into analog radio frequency carrier signals.

9. The method according to claim 8, further comprising recreating the words associated with the radio signal information from the analog radio frequency carrier signals.

10. The method according to claim 9, wherein the words are recreated using any of filtering, digital down converting, in-phase and in-quadrature mixing, mixing, digital to analog conversion, and combinations thereof.

11. The method according to claim 8, further comprising multiplexing the words associated with the radio signal information and the words associated with the general information to recover the digital protocol frames.

12. The method according to claim 11, further comprising multiplexing the digital protocol frames to recreate the digital fronthaul data.

13. The method according to claim 7, further comprising removing unneeded data from the digital protocol frames.

14. The method according to claim 1, further comprising transmitting synchronization information between the transmitter and the receiver.

15. The method according to claim 14, further comprising utilizing the synchronization information to reassemble the radio signal information and the general information into the digital fronthaul data.

16. The method according to claim 1, further comprising processing the general information prior to transmitting the general information.

17. A system, comprising a baseband unit (BBU) communicatively coupled with a radio frequency unit (RFU), at least one of the BBU and the RFU being configured to separate digital fronthaul data into digital general information and radio signal information representing an analog signal, transmit the digital general information over a wireless network segment on a first communications channel, and transmit the radio signal information over the wireless network segment in analog format on a second communications channel.

18. The system according to claim 17, wherein the baseband unit comprises a demultiplexer that demultiplexes radio signal information into analog carrier images.

19. The system according to claim 17, wherein the radio frequency unit comprises a multiplexer that multiplexes analog carrier images into the radio signal information.

20. The system according to claim 19, further comprising a radio frequency unit coupling module communicatively coupled with the radio frequency unit that adapts the carrier images based on an associated radio access technology protocol.

21. The system according to claim 17, wherein the baseband unit transmits the radio signal information representing the analog signal over the wireless network segment to a second radio frequency unit, in analog format, via a second communications channel.

22. The system according to claim 19, wherein the RFU is controlled using control information received by the RFU coupling unit.

23. A method of transforming information for efficient transmission over a wireless network segment, the method comprising:

separating, via a transmitter, digital fronthaul data into general information and radio signal information, wherein the radio signal information is a digital representation of an analog signal and the general information is in a digital format;

converting the radio signal information into a plurality of radio frequency carrier signals in analog format; and digitally modulating the general information in the digital format.

\* \* \* \* \*

UNITED STATES PATENT AND TRADEMARK OFFICE
CERTIFICATE OF CORRECTION

PATENT NO. : 9,020,070 B2
APPLICATION NO. : 13/735903
DATED : April 28, 2015
INVENTOR(S) : Laurent Bellot et al.

It is certified that error appears in the above-identified patent and that said Letters Patent is hereby corrected as shown below:

On the title page items (71) and (72) please delete the text "Elsayed" and insert the text
--El Sayed-Ahmad.--

Signed and Sealed this
Fourteenth Day of June, 2016

Michelle K. Lee
*Director of the United States Patent and Trademark Office*